(12) United States Patent
Yoshitake et al.

(10) Patent No.: US 8,924,083 B2
(45) Date of Patent: Dec. 30, 2014

(54) POWER STEERING APPARATUS, AND CONTROLLER FOR POWER STEERING APPARATUS

(71) Applicant: Hitachi Automotive Systems Steering, Ltd., Saitama (JP)

(72) Inventors: Atsushi Yoshitake, Ebina (JP); Kohtaro Shiino, Isehara (JP); Hiroshi Sato, Yokohama (JP)

(73) Assignee: Hitachi Automotive Systems Steering, Ltd., Saitama (JP)

( * ) Notice: Subject to any disclaimer, the term of this patent is extended or adjusted under 35 U.S.C. 154(b) by 29 days.

(21) Appl. No.: 13/854,352

(22) Filed: Apr. 1, 2013

(65) Prior Publication Data

US 2013/0289826 A1 Oct. 31, 2013

(30) Foreign Application Priority Data

Apr. 26, 2012 (JP) ................................. 2012-100513

(51) Int. Cl.
*B62D 5/04* (2006.01)
*B62D 15/02* (2006.01)

(52) U.S. Cl.
CPC ............ *B62D 5/0493* (2013.01); *B62D 15/021* (2013.01); *B62D 5/049* (2013.01); *B62D 5/0463* (2013.01)
USPC ........................................... 701/42; 180/412

(58) Field of Classification Search
CPC .... B62D 5/049; B62D 5/0493; B62D 5/0463; B62D 15/021

USPC ............................................ 701/42; 180/412
See application file for complete search history.

(56) References Cited

U.S. PATENT DOCUMENTS

2011/0080160 A1* 4/2011 Tomita ........................ 324/76.77

FOREIGN PATENT DOCUMENTS

JP 2011-80841 A 4/2011

OTHER PUBLICATIONS

Corresponding U.S. Appl. No. 13/854,360, filed Apr. 1, 2013.

\* cited by examiner

*Primary Examiner* — Mary Cheung
*Assistant Examiner* — Yuen Wong
(74) *Attorney, Agent, or Firm* — Crowell & Moring LLP

(57) ABSTRACT

In a power steering system, a torque sensor obtains first and second rotation angles, and a steering angle sensor obtains third and fourth rotation angles. A controller includes a first absolute rotation angle calculation section, a second absolute rotation angle calculation section, and an abnormality detection section. The first absolute rotation angle calculation section calculates a first absolute rotation angle as a first estimate of an absolute rotation angle of a steering wheel based on the first and third rotation angles. The second absolute rotation angle calculation section calculates a second absolute rotation angle as a second estimate of the absolute rotation angle of the steering wheel based on the third and fourth rotation angles. The abnormality detection section detects an abnormality by comparison between the first absolute rotation angle and the second absolute rotation angle.

19 Claims, 6 Drawing Sheets

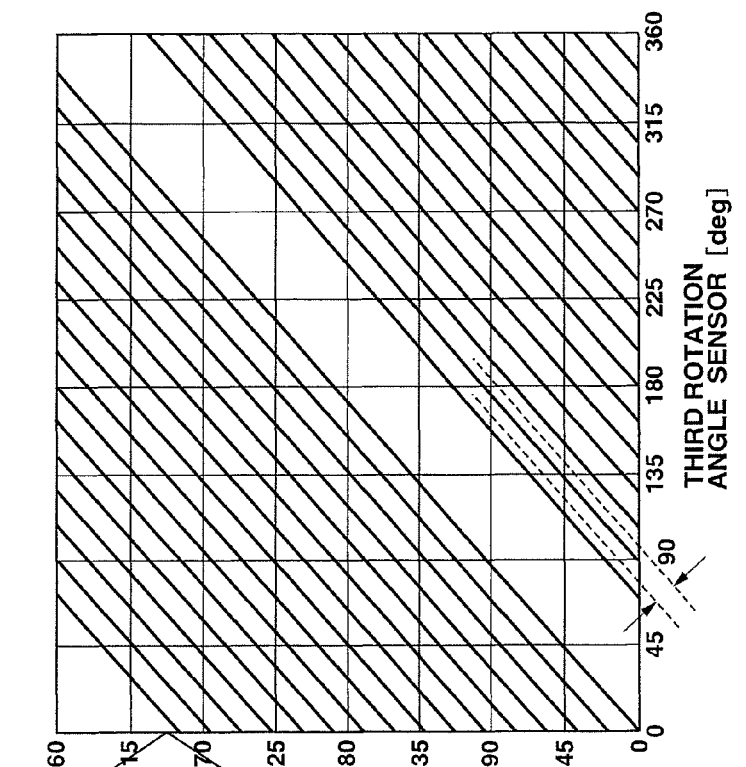
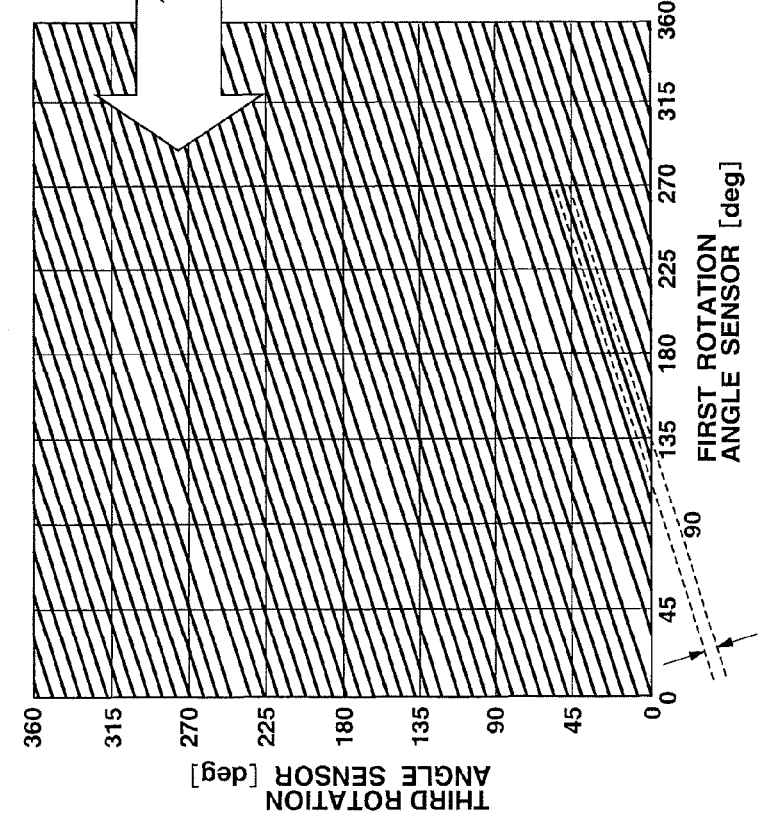

POWER STEERING APPARATUS, AND CONTROLLER FOR POWER STEERING APPARATUS

BACKGROUND OF THE INVENTION

The present invention relates to an electric power steering apparatus or system, which is provided with an electric motor as a drive source and is configured to apply an assist steering effort to a steering mechanism of a motor vehicle, and relates to a controller for such a power steering apparatus.

Japanese Patent Application Publication 2011-080841, which corresponds to United States Patent Application Publication 2011/0080160, discloses an electric power steering apparatus that is provided with an electric motor, and is configured to sense a steering angle of a steering wheel from its neutral position, and cause the electric motor to apply an assist steering effort to a steering mechanism of a motor vehicle on a basis of the sensed steering angle. The steering angle of the steering wheel from the neutral position is measured with a torque sensor or steering angle sensor.

SUMMARY OF THE INVENTION

The power steering apparatus described above is confronted by a problem that when the sensed steering angle obtained by the torque sensor or steering angle sensor is abnormal due to a detection error or the like, the abnormality cannot be identified, but the erroneous sensed steering angle is referred to for controlling the assist steering effort applied to the steering mechanism.

In view of the foregoing, it is desirable to provide a power steering apparatus with a controller which is capable of detecting a failure of detection of the steering angle of a steering wheel from its neutral position.

According to one aspect of the present invention, a power steering apparatus comprises: a steering mechanism including: a steering shaft including: an input shaft configured to be rotated by steering operation of a steering wheel; an output shaft; and a torsion bar connected between the input shaft and the output shaft, and configured to transmit rotation of the input shaft to the output shaft; and a motion conversion mechanism configured to convert rotation of the output shaft to steering motion of a steerable wheel; an electric motor configured to apply a steering effort to the steering mechanism; a torque sensor including: a first rotation angle sensor configured to sense as a first rotation angle a rotation angle of the input shaft; and a second rotation angle sensor configured to sense as a second rotation angle a rotation angle of the output shaft; wherein the torque sensor is configured to determine a steering torque on a basis of a relative rotation angle between the first rotation angle and the second rotation angle, wherein the steering torque occurs in the steering shaft; a third rotation angle sensor including a first rotation member configured to be rotated by rotation of the steering shaft, wherein the third rotation angle sensor is configured to sense as a third rotation angle a rotation angle of the first rotation member; a fourth rotation angle sensor including a second rotation member configured to be rotated by rotation of the first rotation member at a gear ratio other than one with respect to the first rotation member, wherein the fourth rotation angle sensor is configured to sense as a fourth rotation angle a rotation angle of the second rotation member; and an electrical control unit configured to control operation of the electric motor, wherein the electrical control unit includes: a motor command value calculation section configured to calculate a command value of a current supplied to the electric motor on a basis of the steering torque; a first absolute rotation angle calculation section configured to calculate a first absolute rotation angle as a first estimate of an absolute rotation angle of the steering wheel on a basis of at least one of combinations, wherein the combinations include a combination of the first rotation angle and the second rotation angle, a combination of the first rotation angle and the third rotation angle, a combination of the first rotation angle and the fourth rotation angle, a combination of the second rotation angle and the third rotation angle, and a combination of the second rotation angle and the fourth rotation angle; a second absolute rotation angle calculation section configured to calculate a second absolute rotation angle as a second estimate of the absolute rotation angle of the steering wheel on a basis of a combination of the third rotation angle and the fourth rotation angle; and an abnormality detection section configured to detect an abnormality by comparison between the first absolute rotation angle and the second absolute rotation angle.

According to another aspect of the invention, a controller for a power steering apparatus, wherein the power steering apparatus is configured to apply a steering effort to a steerable wheel of a vehicle by an electric motor in response to steering operation of a steering wheel, comprises an electrical control unit configured to control operation of the electric motor on a basis of an operating condition of the vehicle, wherein the electrical control unit includes: a first rotation angle obtaining section configured to receive a signal indicative of a first rotation angle that is a rotation angle of an input shaft of a steering shaft, wherein the input shaft is configured to be rotated by steering operation of the steering wheel; a steering torque calculation section configured to calculate a steering torque on a basis of a relative rotation between the first rotation angle and a second rotation angle that is a rotation angle of an output shaft of the steering shaft, wherein the steering shaft includes a torsion bar connected between the input shaft and the output shaft, and wherein the steering torque occurs in the steering shaft; a motor command value calculation section configured to calculate a command value of a current supplied to the electric motor on a basis of the steering torque; a third rotation angle obtaining section configured to receive a signal indicative of a third rotation angle that is a rotation angle of a first rotation member, wherein the first rotation member is configured to be rotated by rotation of the steering shaft; a fourth rotation angle obtaining section configured to receive a signal indicative of a fourth rotation angle that is a rotation angle of a second rotation member, wherein the second rotation member is configured to be rotated by rotation of the first rotation member at a gear ratio other than one with respect to the first rotation member; a first absolute rotation angle calculation section configured to calculate a first absolute rotation angle as a first estimate of an absolute rotation angle of the steering wheel on a basis of at least one of combinations, wherein the combinations include a combination of the first rotation angle and the second rotation angle, a combination of the first rotation angle and the third rotation angle, a combination of the first rotation angle and the fourth rotation angle, a combination of the second rotation angle and the third rotation angle, and a combination of the second rotation angle and the fourth rotation angle; a second absolute rotation angle calculation section configured to calculate a second absolute rotation angle as a second estimate of the absolute rotation angle of the steering wheel on a basis of a combination of the third rotation angle and the fourth rotation angle; and an abnormality detection section configured to detect an abnormality by comparison between the first absolute rotation angle and the second absolute rotation angle.

BRIEF DESCRIPTION OF THE DRAWINGS

FIG. 6A is a graph showing a first absolute rotation angle conversion map, and FIG. 6B is a graph showing a second absolute rotation angle conversion map.

DETAILED DESCRIPTION OF THE INVENTION

Figure 1:
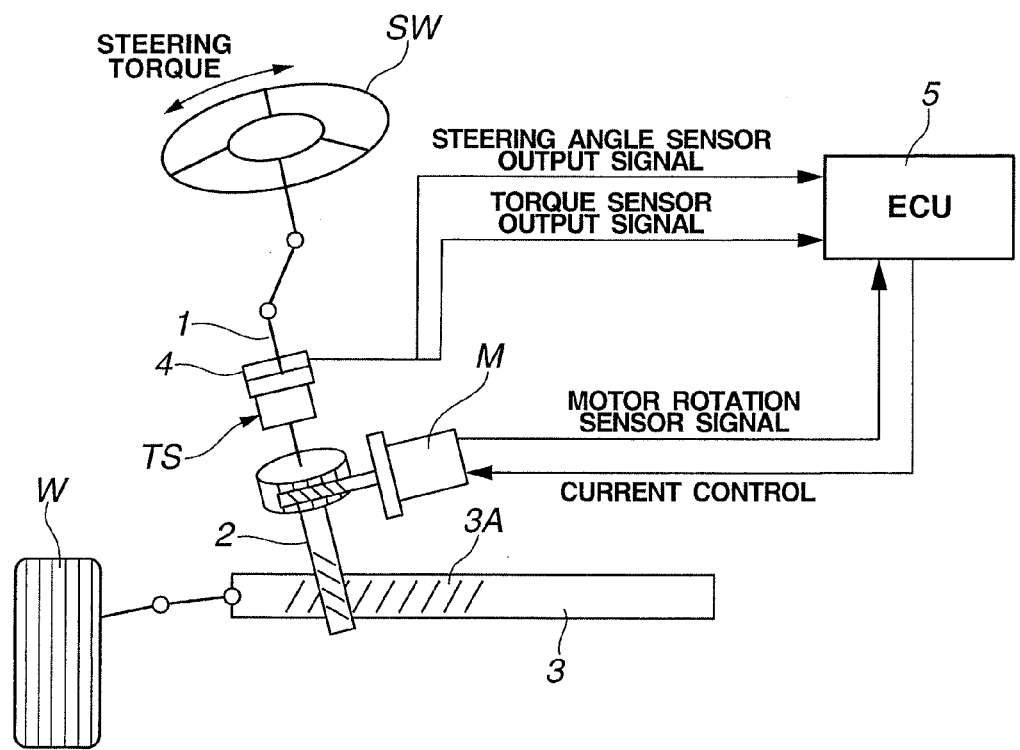
FIG. 1 is a schematic diagram showing an electric power steering apparatus according to a first embodiment of the present invention.

<First Embodiment> FIG. 1 schematically shows an electric power steering apparatus according to a first embodiment of the present invention. The electric power steering apparatus includes a steering mechanism that is generally composed of a steering wheel "SW", a steering shaft 1, a pinion shaft 2, and a rack shaft 3. When steering wheel SW is rotated by a driver, a steering torque applied to steering wheel SW is transmitted to pinion shaft 2 through the steering shaft 1, which causes a rotary motion of pinion shaft 2 that is converted into a linear motion of rack shaft 3, to steer left and right steerable wheels W linked to left and right ends of rack shaft 3. Rack shaft 3 is formed with a rack tooth section 3A that is configured to mesh with pinion shaft 2, wherein the mesh between rack tooth section 3A of rack shaft 3 and pinion shaft 2 forms a motion conversion mechanism for converting rotation of steering shaft 1 to a steering action.

Steering shaft 1 is provided with a torque sensor "TS" and a steering angle sensor 4 for measuring the rotation angle of steering shaft 1. The information about the rotation angle of steering shaft 1 is transmitted in output signals to an electrical control unit (ECU) 5. Electrical control unit 5 is configured to perform a current control for an electric motor "M" on a basis of the output signals of torque sensor TS and steering angle sensor 4, and a signal from a motor rotation sensor, and thereby cause electric motor M to apply an assist steering effort to pinion shaft 2.

Figure 2:
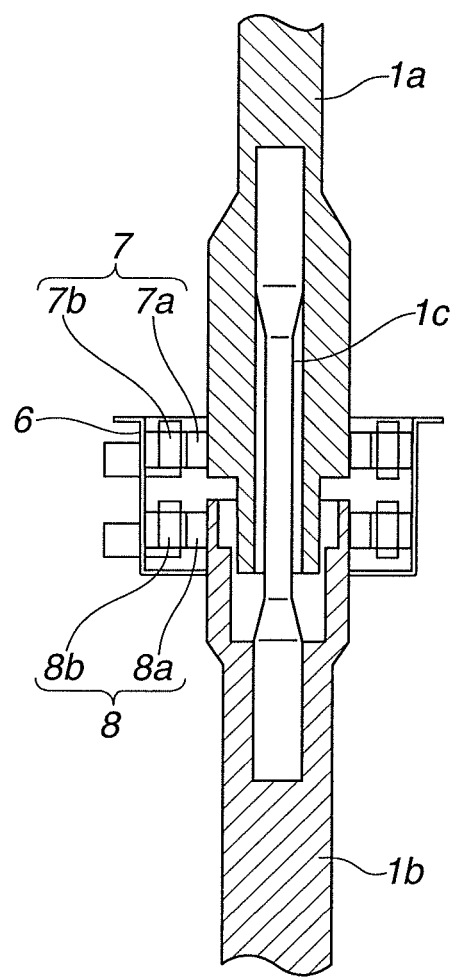
FIG. 2 is a cross-sectional view of a torque sensor of the electric power steering apparatus of FIG. 1.

As shown in FIG. 2, steering shaft 1 is composed of an input shaft 1a and an output shaft 1b, wherein input shaft 1a is connected to and closer to steering wheel SW, and output shaft 1b is connected to and closer to rack shaft 3. Each of input shaft 1a and output shaft 1b has a hollow cylindrical shape, wherein the inside spaces of input shaft 1a and output shaft 1b accommodate a torsion bar 1c which is connected between input shaft 1a and output shaft 1b for setting the input shaft 1a and output shaft 1b coaxially. The connection between input shaft 1a and torsion bar 1c and the connection between output shaft 1b and torsion bar 1c are implemented by pin connection, press fit, or the like. In this construction, input shaft 1a and output shaft 1b are capable of rotating with respect to each other, which causes a twisting deformation of torsion bar 1c.

Steering shaft 1 is provided with a casing 6 fixed to a vehicle body for protecting steering shaft 1 in external use environments. Casing 6 surrounds the periphery of steering shaft 1. A first rotation angle sensor 7 such as a resolver is provided between the inner peripheral surface of casing 6 and the outer peripheral surface of input shaft is for sensing as a first rotation angle a rotational displacement of input shaft 1a. Similarly, a second rotation angle sensor 8 such as a resolver is provided between the inner peripheral surface of casing 6 and the outer peripheral surface of output shaft 1b for sensing as a second rotation angle a rotational displacement of output shaft 1b.

The information obtained by first rotation angle sensor 7 and second rotation angle sensor 8 is referred to for sensing the steering torque applied to steering shaft 1. Specifically, the relative rotation between input shaft 1a and output shaft 1b, which is achieved by twisting deformation of torsion bar 1c, is measured by the combination of first rotation angle sensor 7 and second rotation angle sensor 8, to determine the steering torque for rotating the steering wheel SW which is applied by the driver. In this way, first rotation angle sensor 7 and second rotation angle sensor 8 constitute torque sensor TS to measure the torque applied to steering shaft 1.

Each of first rotation angle sensor 7 and second rotation angle sensor 8 is of a variable reluctance (VR) type in which only a stator is provided with a coil but a rotor is provided with no coil. Specifically, first rotation angle sensor 7 includes an input-shaft-side rotor 7a and an input-shaft-side stator 7b. Input-shaft-side rotor 7a has a ring-shape and is integrally fitted on and fixed to the outer peripheral surface of input shaft 1a. Input-shaft-side stator 7b has a ring-shape, and is clearance-fitted on the outer peripheral surface of input-shaft-side rotor 7a with a predetermined radial clearance, and is fixed to casing 6. On the other hand, second rotation angle sensor 8 includes an output-shaft-side rotor 8a and an output-shaft-side stator 8b. Output-shaft-side rotor 8a has a ring-shape and is integrally fitted on and fixed to the outer peripheral surface of output shaft 1b. Output-shaft-side stator 8b has a ring-shape, and is clearance-fitted on the outer peripheral surface of output-shaft-side rotor 8a with a predetermined radial clearance, and is fixed to casing 6.

The output signal of first rotation angle sensor 7 and the output signal of second rotation angle sensor 8 are inputted into electrical control unit 5 through a communication means such as a harness (clock cable, slip ring, etc.) or through wireless communication. Electrical control unit 5 includes a steering torque calculation section not shown, which is configured to calculate an angle of twist of torsion bar 1c based on a difference between the output value of first rotation angle sensor 7 and the output value of second rotation angle sensor 8, and calculate the steering torque occurring in torsion bar 1c, based on the angle of twist of torsion bar 1c by using an equation of [steering torque]=[angle of twist of torsion bar]×[rigidity of torsion bar]. Electrical control unit 5 also receives input of a motor rotation sensor signal, a vehicle speed signal, a steering speed signal, etc., and includes a motor command value calculation section or circuit not shown which is configured to calculate a command value of a current supplied to electric motor M, based on the measured steering torque, motor rotation sensor signal, vehicle speed signal, and steering speed signal.

Figure 3A:
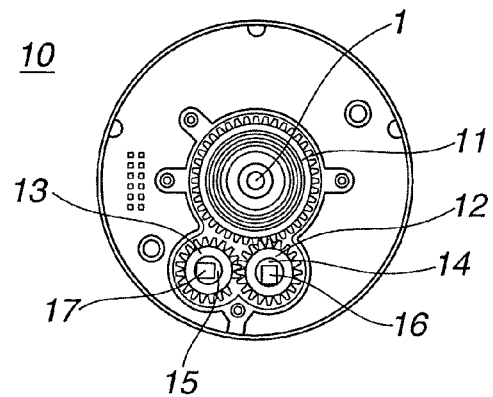
FIGS. 3A and 3B are diagrams showing configuration of a steering angle sensor of the electric power steering apparatus of FIG. 1.
Figure 3B:
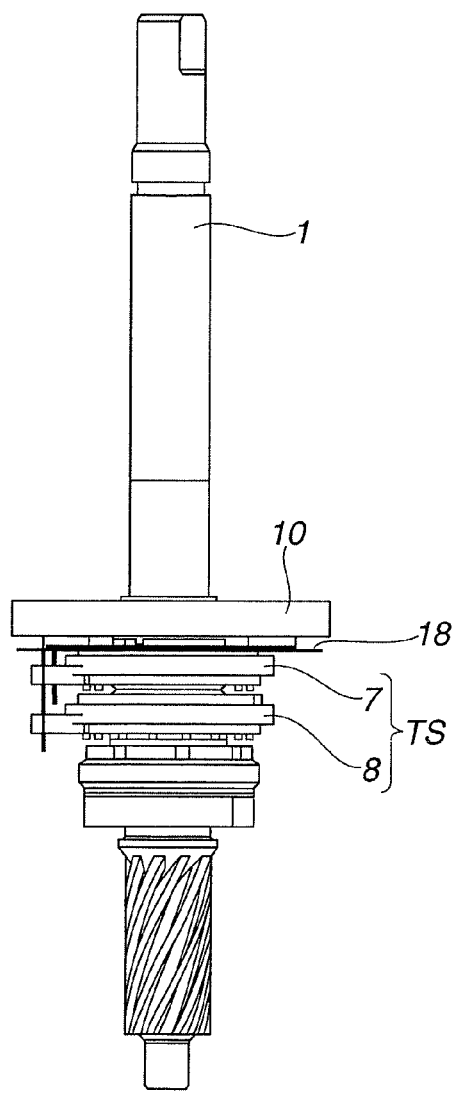

As shown in FIGS. 3A and 3B, steering angle sensor 4 includes a first gear 11, a second gear (first rotation member) 12, and a third gear (second rotation member) 13. First gear 11 is a rotation member that is rotated directly by rotation of steering shaft 1. Second gear 12 meshes with first gear 11, and is rotated by first gear 11. Third gear 13 meshes with second gear 12, and is rotated by second gear 12. A circuit board 18 is provided, covering the first gear 11, second gear 12, and third gear 13.

Each gear 11, 12, 13 is formed with teeth at the periphery. Second gear 12 and third gear 13 serve for sensing, and have gear ratios other than 1 with respect to each other. Gear 12, 13 is provided with a magnetic member 14, 15 that is magnetized to have a north pole and a south pole. A first magnetic resistance element (MR element) 16 is attached to circuit board 18, facing the magnetic member 14, and serving as a third rotation angle sensor. A second magnetic resistance element (MR element) 17 is attached to circuit board 18, facing the magnetic member 15, and serving as a fourth rotation angle sensor. Each magnetic resistance element 16, 17 is configured to sense a change of a magnetic field occurring in the corresponding magnetic member 14, 15 as a change of a resistance of a resistance element, and thereby sense a rotation angle of second gear 12 as a third rotation angle and a rotation angle of third gear 13 as a fourth rotation angle. The third and fourth rotation angles are used to determine the steering angle of steering wheel SW.

Figure 4:
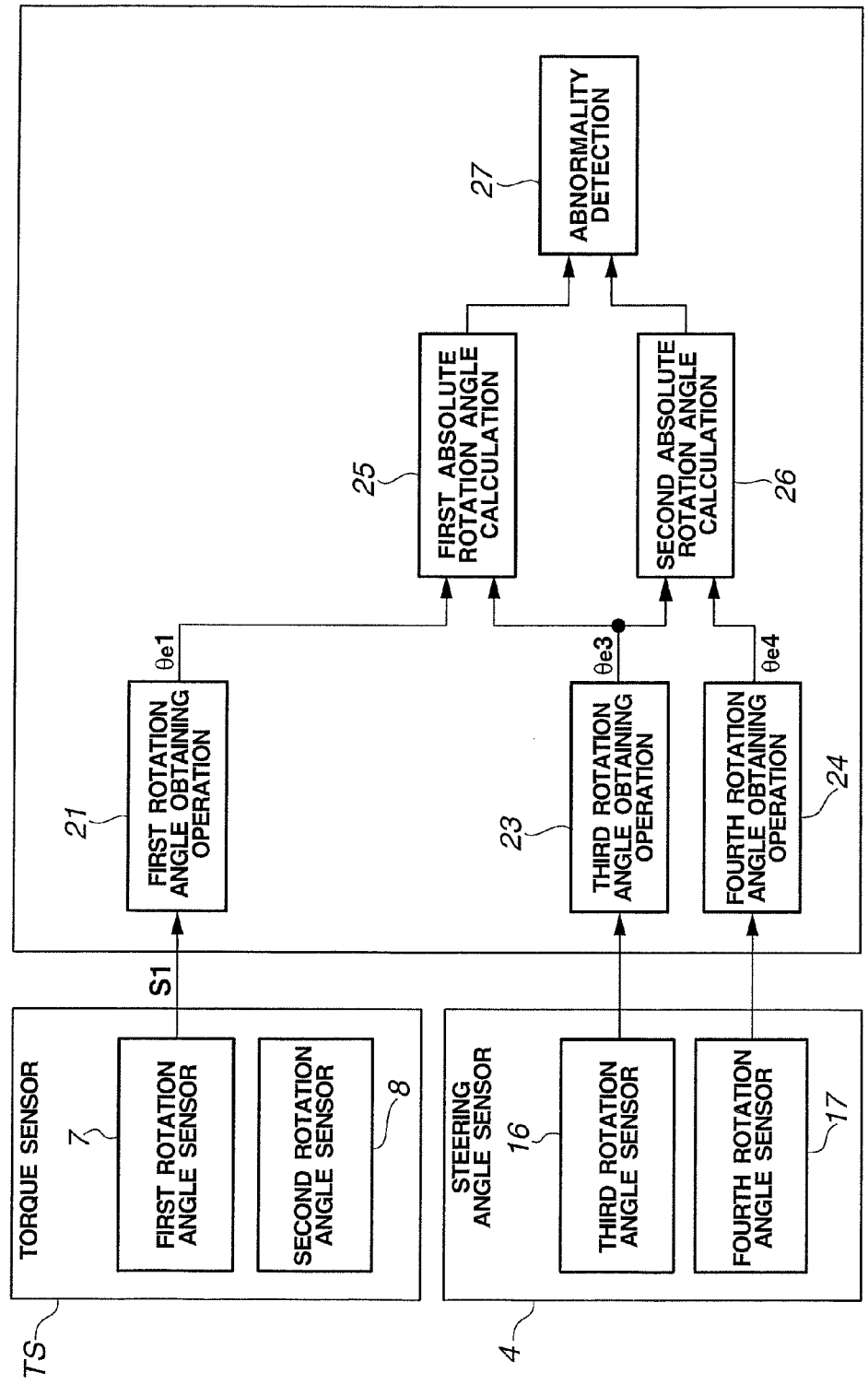
FIG. 4 is a block diagram showing an electrical control unit (ECU) of the electric power steering apparatus of FIG. 1.

The following describes operation of electrical control unit 5 according to the first embodiment. As shown in FIG. 4, electrical control unit 5 includes a first rotation angle obtaining section 21, a third rotation angle obtaining section 23, a fourth rotation angle obtaining section 24, a first absolute rotation angle calculation section 25, a second absolute rotation angle calculation section 26, and an abnormality detection section 27. First rotation angle obtaining section 21 is configured to receive input of a first rotation angle signal S1 as a combination of a sine-wave signal and a cosine-wave signal, wherein first rotation angle signal S1 is an output signal from torque sensor TS (first rotation angle sensor), and calculate a first electrical angle $\theta e1$ corresponding to the rotational position of input shaft $1a$ based on the first rotation angle signal S1. Third rotation angle obtaining section 23 is configured to receive input of a third rotation angle signal S3 as a combination of a sine-wave signal and a cosine-wave signal, wherein third rotation angle signal S3 is an output signal from steering angle sensor 4 (combination of third rotation angle sensor 16 and fourth rotation angle sensor 17), and calculate a third electrical angle $\theta e3$ corresponding to the rotational position of second gear 12, based on the third rotation angle signal S3. Similarly, fourth rotation angle obtaining section 24 is configured to receive input of a fourth rotation angle signal S4 as a combination of a sine-wave signal and a cosine-wave signal, wherein fourth rotation angle signal S4 is an output signal from steering angle sensor 4 (combination of third rotation angle sensor 16 and fourth rotation angle sensor 17), and calculate a fourth electrical angle $\theta e4$ corresponding to the rotational position of third gear 13, based on the fourth rotation angle signal S4. First absolute rotation angle calculation section 25 is configured to calculate as a first absolute rotation angle a first estimate of a total amount of rotation of steering wheel SW from its neutral position, based on the first electrical angle $\theta e1$ and third electrical angle $\theta e3$. Second absolute rotation angle calculation section 26 is configured to calculate as a second absolute rotation angle a second estimate of the total amount of rotation of steering wheel SW from its neutral position, based on the third electrical angle $\theta e3$ and fourth electrical angle $\theta e4$. Abnormality detection section 27 is configured to detect an abnormality based on comparison between the first absolute rotation angle calculated by first absolute rotation angle calculation section 25 and the second absolute rotation angle calculated by second absolute rotation angle calculation section 26. The neutral position of steering wheel SW is a position when left and right steerable wheels W are directed in a vehicle longitudinal direction so as to allow the vehicle to travel straight.

Figure 5A:
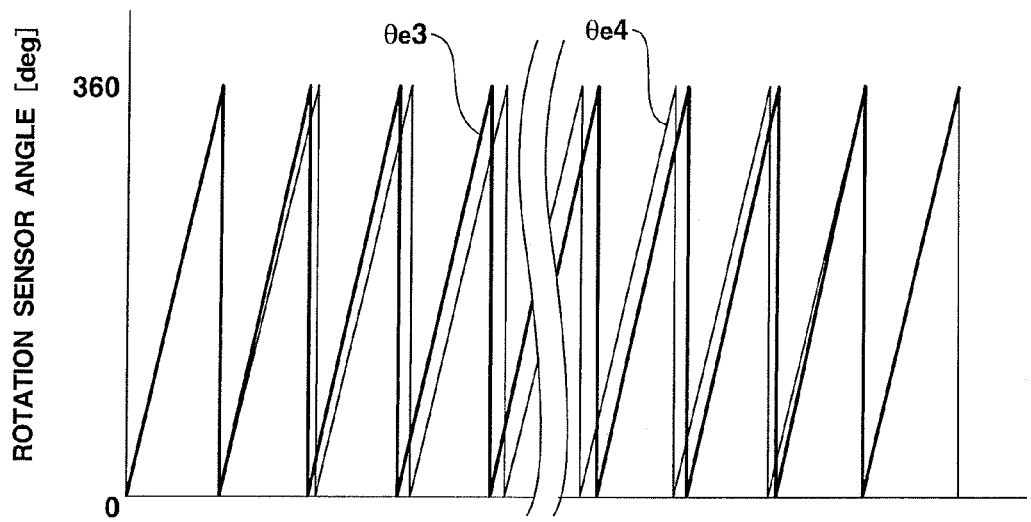
FIG. 5A is a time chart showing a relationship between a third electrical angle θe3 and a fourth electrical angle θe4.
Figure 5B:
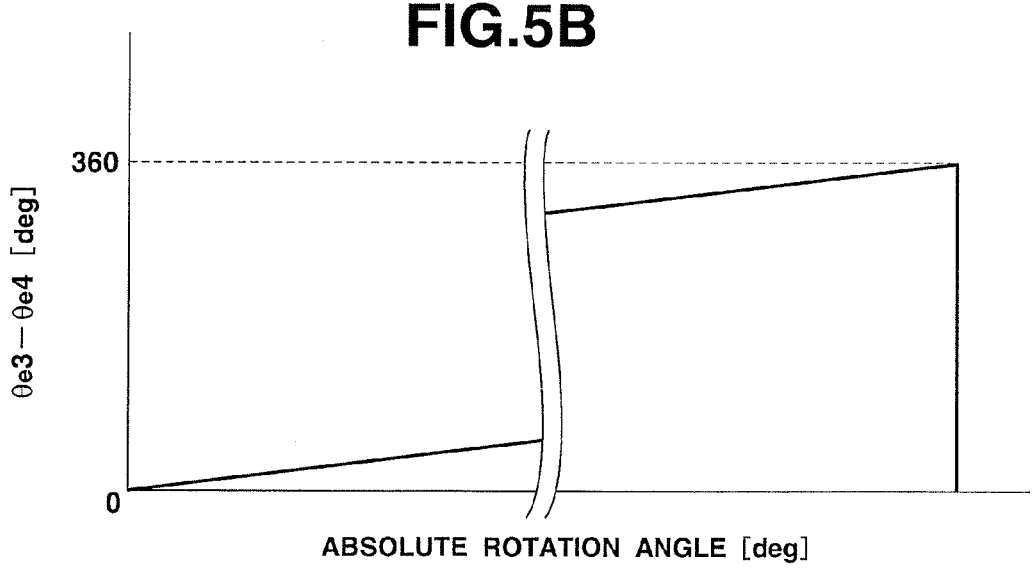
FIG. 5B is a graph showing a relationship between an absolute rotation angle of a steering wheel and a difference between third electrical angle θe3 and fourth electrical angle θe4.

FIG. 5A is a time chart showing a relationship between third electrical angle $\theta e3$ and fourth electrical angle $\theta e4$, and FIG. 5B is a graph showing a relationship between the second absolute rotation angle of steering wheel SW and the difference between third electrical angle $\theta e3$ and fourth electrical angle $\theta e4$. The horizontal axis represents the second absolute rotation angle. As shown in FIG. 5A, the third electrical angle $\theta e3$ of second gear 12 is reset to zero degree every time the second gear 12 rotates once so that the third electrical angle $\theta e3$ reaches 360 degrees. Similarly, the fourth electrical angle $\theta e4$ of third gear 13 is reset to zero degree every time the third gear 13 rotates once so that the fourth electrical angle $\theta e4$ reaches 360 degrees. Each value of the rotation angle of steering shaft 1, which corresponds to the steering angle of steering wheel SW, corresponds to a unique combination of third electrical angle $\theta e3$ and fourth electrical angle $\theta e4$, because second gear 12 and third gear 13 rotate at different speeds with respect to the rotation angle of steering shaft 1. Accordingly, the rotation angle of steering wheel SW can be identified as the second absolute rotation angle based on the combination of third electrical angle $\theta e3$ and fourth electrical angle $\theta e4$. Similarly, the rotation angle of steering wheel SW can be identified as the first absolute rotation angle based on combination of the first electrical angle $\theta e1$ and third electrical angle $\theta e3$.

Abnormality detection section 27 compares the first absolute rotation angle with the second absolute rotation angle, and thereby checks whether or not an abnormality is present in the system. This is based on the following principle. When all of the first, third and fourth rotation angle sensors are normal, the first absolute rotation angle is equal to the second absolute rotation angle. On the other hand, when one of the first, third and fourth rotation angle sensors is abnormal, the first absolute rotation angle can differ from the second absolute rotation angle. If the third rotation angle sensor is abnormal, this abnormality causes errors both in the first absolute rotation angle and the second absolute rotation angle. This is taken into account for design of the system so that when the third rotation angle sensor is abnormal, this abnormality causes different errors in the first absolute rotation angle and the second absolute rotation angle, preventing the first absolute rotation angle and the second absolute rotation angle from being equal to each other even with the abnormality. When the error of each sensor goes beyond a dotted line shown in FIGS. 6A and 6B, an abnormality occurs with the subject absolute rotation angle.

The following describes a threshold value for abnormality detection at abnormality detection section 27. FIG. 6A is a graph showing a first absolute rotation angle conversion map defining the relationship between first electrical angle $\theta e1$ and third electrical angle $\theta e3$. FIG. 6B is a graph showing a second absolute rotation angle conversion map defining the relationship between third electrical angle $\theta e3$ and fourth electrical angle $\theta e4$.

The first absolute rotation angle conversion map shown in FIG. 6A has a horizontal axis representing the first electrical angle $\theta e1$ and a vertical axis representing the third electrical angle $\theta e3$. The second absolute rotation angle conversion map shown in FIG. 6B has a horizontal axis representing the third electrical angle $\theta e3$ and a vertical axis representing the fourth electrical angle $\theta e4$. Each absolute value conversion map has a range in degree from zero to 360 in the horizontal axis and a range in degree from zero to 360 in the vertical axis.

The first absolute value conversion map includes a plurality of regions which are defined by combinations of first electrical angle θe1 and third electrical angle θe3 corresponding to variation of the first absolute rotation angle. Similarly, the second absolute value conversion map includes a plurality of regions which are defined by combinations of third electrical angle θe3 and fourth electrical angle θe4 corresponding to variation of the second absolute rotation angle.

For example, when rotation of steering wheel SW causes a rotation of second gear 12 and a rotation of third gear 13 from a condition where both of third electrical angle θe3 and fourth electrical angle θe4 are equal to zero, then both of third electrical angle θe3 and fourth electrical angle θe4 increase gradually from zero. Then, fourth electrical angle θe4 reaches 360 degrees, while third electrical angle θe3 reaches 343 degrees. This behavior is defined by a region which has a starting end point at which both of third electrical angle θe3 and fourth electrical angle θe4 are equal to zero, and has a terminating end point at which third electrical angle θe3 is equal to 343 degrees and fourth electrical angle θe4 is equal to 360 degrees.

Thereafter, when rotation of steering wheel SW causes a rotation of second gear 12 and a rotation of third gear 13 from the condition where third electrical angle θe3 is equal to 343 degrees and fourth electrical angle θe4 is equal to zero, then both of third electrical angle θe3 and fourth electrical angle θe4 increase. Then, third electrical angle θe3 reaches 360 degrees, while fourth electrical angle θe4 reaches 18 degrees. This behavior is defined by a region which has a starting end point at which third electrical angle θe3 is equal to 343 degrees and fourth electrical angle θe4 is equal to zero, and has a terminating end point at which third electrical angle θe3 is equal to 360 degrees and fourth electrical angle θe4 is equal to 18 degrees.

Thereafter, when rotation of steering wheel SW causes a rotation of second gear 12 and a rotation of third gear 13 from the condition where third electrical angle θe3 is equal to zero and fourth electrical angle θe4 is equal to 18 degrees, then both of third electrical angle θe3 and fourth electrical angle θe4 increase. Then, fourth electrical angle θe4 reaches 360 degrees, while third electrical angle θe3 reaches 324 degrees. This behavior is defined by a region which has a starting end point at which third electrical angle θe3 is equal to zero and fourth electrical angle θe4 is equal to 18 degrees, and has a terminating end point at which third electrical angle θe3 is equal to 324 degrees and fourth electrical angle θe4 is equal to 360 degrees. In this way, a plurality of regions are defined in the second absolute rotation angle conversion map.

In summary, each absolute rotation angle conversion map defines a plurality of regions each of which has a starting end point at which one of two electrical angles is equal to zero and has a terminating end point at which the other electrical angle is equal to 360 degrees, thus allowing to identify the corresponding absolute rotation angle even when the absolute rotation angle is greater than 360 degrees.

The threshold for error detection used in abnormality detection section 27 is set to a value obtained by summing $\alpha/2$ and a predetermined margin for a tolerable error of the first absolute rotation angle in the second absolute rotation angle conversion map, wherein a represents an absolute value of an angle that is obtained by subtracting 360 degrees from the amount of rotation of fourth electrical angle θe4 during one rotation of third electrical angle θe3 in the second absolute rotation angle conversion map.

Namely, in the second absolute rotation angle conversion map, the interval between two adjacent regions is equal to the angle $\alpha$. If the second absolute rotation angle contains an error of more than $\alpha/2$ in the second absolute rotation angle conversion map, the second absolute rotation angle is incorrectly identified as a value existing in a different region adjacent to the correct region. This incorrect identification is prevented by the feature that when the difference between the first absolute rotation angle and the second absolute rotation angle in the second absolute rotation angle conversion map is greater than $\alpha/2$, the presence of abnormality in one of the first absolute rotation angle and the second absolute rotation angle is assumed and determined.

On the other hand, the first absolute rotation angle contains an error of detection even when no abnormality is present, the tolerable amount of error is added to $\alpha/2$ to obtain the threshold value for abnormality detection, thus achieving precise abnormality detection.

As discussed above, the electric power steering apparatus according to the first embodiment is capable of detecting an abnormality with high precision by comparing the first absolute rotation angle obtained based on the first and third rotation angle sensors with the second absolute rotation angle obtained based on the third and fourth rotation angle sensors, wherein the first absolute rotation angle and the second absolute rotation angle should be equal to each other when no abnormality is present.

Moreover, the feature that steering angle sensor 4 is implemented by magnetic resistance sensor technology, serves to provide a high-responsive rotation angle sensor resistant to environmental changes.

<Second Embodiment> The following describes an electric power steering apparatus according to a second embodiment of the present invention. The second embodiment is different from the first embodiment in the threshold for abnormality detection. The other configuration is the same as in the first embodiment.

In the second embodiment, a region is defined to have a range of $\pm 180\alpha/(360-\alpha)$ in one of the rotation angles and a range of $\pm\alpha/2$ in the other rotation angle from a point in the second absolute rotation angle conversion map which corresponds to the first absolute rotation angle. This region is referred to as an abnormality check region (or normal region) for the second absolute rotation angle.

Specifically, in the second absolute rotation angle conversion map, where the interval between two regions adjacent to each other in the vertical axis (fourth electrical angle θe4) is represented by a degrees, the interval therebetween in the horizontal axis (third electrical angle θe3) is equal to $360\alpha/(360-\alpha)$ degrees. Accordingly, If the second absolute rotation angle contains an error more than $\alpha/2$ in the vertical axis (fourth electrical angle θe4) in the second absolute rotation angle conversion map, or if the second absolute rotation angle contains an error more than $180\alpha/(360-\alpha)$ in the horizontal axis (third electrical angle θe3) in the second absolute rotation angle conversion map, then the second absolute rotation angle is incorrectly identified to equal to a value contained in the region adjacent to the correct region.

Incidentally, in the second absolute rotation angle conversion map, where the interval between two regions adjacent to each other in the horizontal axis (third electrical angle θe3) is represented by a degrees, the interval therebetween in the vertical axis (fourth electrical angle θe4) is equal to $360\alpha/(360-\alpha)$ degrees. This relationship is the same as in the case described above in which when the interval between two regions adjacent to each other in the vertical axis (fourth electrical angle θe4) is represented by $\alpha$ degrees, the interval therebetween in the horizontal axis (third electrical angle θe3) is equal to 360α/(360−α) degrees.

In consideration of the fact described above, in the second embodiment, it is determined that the system is abnormal, when the point representing the second absolute rotation angle in the second absolute rotation angle conversion map is out of the abnormality check region having the range of ±180α/(360−α) in one of the rotation angles and the range of ±α/2 from the point in the other rotation angle in the second absolute rotation angle conversion map which corresponds to the first absolute rotation angle.

More specifically, since the first absolute rotation angle also contains a tolerable error of detection, this may be taken into account so that the abnormality check region is defined to have combination of the tolerable error and the range of ±180α/(360−α) in one of the rotation angles and the range of ±α/2. This allows to detect abnormalities with high precision.

<Third Embodiment> The following describes an electric power steering apparatus according to a third embodiment of the present invention. In the third embodiment, when electrical control unit 5 is energized from a de-energized condition, namely, from a condition where no electric power is supplied to electrical control unit 5, the calculation of an absolute rotation angle based on the output signal from torque sensor TS is implemented based on estimation of a count number based on the second absolute rotation angle.

Specifically, when the absolute rotation angle is calculated based on the output signal of torque sensor TS, electrical control unit 5 calculates the absolute rotation angle based on the relative rotation angle from torque sensor TS and the count number N indicating the number of rotations of steering wheel SW.

The following describes a method of calculating an absolute rotation angle based on the first rotation angle signal S1 and second rotation angle signal S2 outputted from torque sensor TS. First, the motor command value calculation section of electrical control unit 5 compares the first rotation angle signal S1 and second rotation angle signal S2 with each other, and calculates as a relative rotation angle a difference between the first rotation angle signal S1 and second rotation angle signal S2.

Each rotation angle of first rotation angle signal S1 and second rotation angle signal S2 and the relative rotation angle have a range from zero to 359 degrees. Namely, when the rotation angle exceeds 359 degrees, the rotation angle becomes zero degree subsequently.

Similarly, when the rotation angle decreases below zero, the relative rotation angle becomes 359 degrees subsequently. The range from zero to 359 degrees is defined as one rotation of electrical angle. When the rotation angle changes passing through a point of change (zero degree (360 degrees)), the number of rotations of steering wheel SW from its neutral position is counted. Namely, when the rotation angle exceeds the position of 359 degrees to the position of zero degree, the number of rotations is counted up to the positive side (count number N=N+1). On the other hand, when the relative rotation angle decreases below the position of zero degree to the position of 359 degrees, the number of rotations is counted down to the negative side (count number N=N−1). The count number N is memorized in a memory means of electrical control unit 5.

The absolute rotation angle, which is the total amount of rotation of steering wheel SW from its neutral position, is calculated based on the relative rotation angle and the count number N representing the number of rotations.

However, once an ignition switch or accessory switch is tuned off, no electric power is supplied to electrical control unit 5, so that the information about count number N memorized in the memory means is erased, and thereby it becomes impossible to calculate the absolute rotation angle based on the count number. This problem is solved by the third embodiment in which when electric power supply to electrical control unit 5 is restarted, electrical control unit 5 uses the information about the second absolute rotation angle, and obtains the number of rotations from the information, to calculate the absolute rotation angle. If the counting of the number of rotations is continued for continuation of detection of steering angle during a period from ignition off to restart, it causes an increase in energy consumption, and promotes the wearing of a battery mounted on the vehicle. In contrast, according to the third embodiment, energy consumption can be suppressed, because the absolute rotation angle can be determined without the memorizing the count number.

The foregoing specifically describes the first to third embodiments, but they may be modified as follows.

In the first and second embodiments, the threshold value for abnormality check is set to include a predetermined margin corresponding to the amount of tolerable error. However, the threshold value may be set without the predetermined margin. This allows to detect abnormality with a more strict standard.

Electrical control unit 5 may be composed of a sensor electrical control unit and a motor electrical control unit, wherein the sensor electrical control unit is configured to receive input of the output signals of the first, second, third, and fourth rotation angle sensors in the form of sine-wave signal and cosine-wave signal, and calculate the rotation angle of steering shaft 1 using the sine-wave signals and cosine-wave signals, and wherein the motor electrical control unit is configured to calculate a command value of a current supplied to electric motor M based on a result of calculation of the sensor electrical control unit.

This configuration leads to that all of the output signals from the first to fourth rotation sensors are inputted into the same sensor electrical control unit, which allows integration and simplification of calculation circuits.

Abnormality detection section 27 may be provided in the motor electrical control unit. This produces an effect that the sensor electrical control unit can be simplified by limitation to specific calculations including rotation angle calculation.

The motor electrical control unit may be implemented by a multicore microcomputer in which a plurality of processor cores are mounted in a single processor package. This enhances the important function about safety of abnormality detection section 27, and thereby enhances the safety of the system.

The motor electrical control unit may be connected to electric motor M. The configuration that the motor electrical control unit is provided closer to the electric motor M serves to suppress a loss in power transmission from the motor electrical control unit to electric motor M.

In the first embodiment, the steering mechanism is of the pinion assist type that applies an assist steering effort from electric motor M to pinion shaft 2, but may be of a dual pinion type that includes: a first pinion shaft is provided at the output shaft; a rack bar includes a first tooth portion meshing with the first pinion and a second tooth portion different from the first tooth portion; a second pinion shaft meshing with the second tooth portion of the rack bar; a worm wheel provided at the second pinion shaft; and a worm shaft meshing with the worm wheel and receives torque from the electric motor.

The configuration that the first pinion rotated by steering wheel SW and the second pinion rotated by electric motor M are provided independently, serves to distribute the load between the first pinion and second pinion, and thereby allows to achieve a high-power system.

In the first embodiment, the first absolute rotation angle is calculated based on the first rotation angle and the third rotation angle. However, the first absolute rotation angle may be calculated based on a basis of at least one of combinations, wherein the combinations include a combination of the first rotation angle and the second rotation angle, a combination of the first rotation angle and the third rotation angle, a combination of the first rotation angle and the fourth rotation angle, a combination of the second rotation angle and the third rotation angle, and a combination of the second rotation angle and the fourth rotation angle.

The entire contents of Japanese Patent Application 2012-100513 filed Apr. 26, 2012 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A power steering apparatus comprising:
   a steering mechanism including:
      a steering shaft including:
         an input shaft configured to be rotated by steering operation of a steering wheel;
         an output shaft; and
         a torsion bar connected between the input shaft and the output shaft, and configured to transmit rotation of the input shaft to the output shaft; and
      a motion conversion mechanism configured to convert rotation of the output shaft to steering motion of a steerable wheel;
   an electric motor configured to apply a steering effort to the steering mechanism;
   a torque sensor including:
      a first rotation angle sensor configured to sense as a first rotation angle a rotation angle of the input shaft; and
      a second rotation angle sensor configured to sense as a second rotation angle a rotation angle of the output shaft;
      wherein the torque sensor is configured to determine a steering torque on a basis of a relative rotation angle between the first rotation angle and the second rotation angle, wherein the steering torque occurs in the steering shaft;
   a third rotation angle sensor including a first rotation member configured to be rotated by rotation of the steering shaft, wherein the third rotation angle sensor is configured to sense as a third rotation angle a rotation angle of the first rotation member;
   a fourth rotation angle sensor including a second rotation member configured to be rotated by rotation of the first rotation member at a gear ratio other than one with respect to the first rotation member, wherein the fourth rotation angle sensor is configured to sense as a fourth rotation angle a rotation angle of the second rotation member; and
   an electrical control unit configured to control operation of the electric motor, wherein the electrical control unit includes:
      a motor command value calculation section configured to calculate a command value of a current supplied to the electric motor on a basis of the steering torque;
      a first absolute rotation angle calculation section configured to calculate a first absolute rotation angle as a first estimate of an absolute rotation angle of the steering wheel on a basis of at least one of combinations, wherein so the combinations include a combination of the first rotation angle and the second rotation angle, a combination of the first rotation angle and the third rotation angle, a combination of the first rotation angle and the fourth rotation angle, a combination of the second rotation angle and the third rotation angle, and a combination of the second rotation angle and the fourth rotation angle;
      a second absolute rotation angle calculation section configured to calculate a second absolute rotation angle as a second estimate of the absolute rotation angle of the steering wheel on a basis of a combination of the third rotation angle and the fourth rotation angle; and
      an abnormality detection section configured to detect an abnormality by comparison between the first absolute rotation angle and the second absolute rotation angle.

2. The power steering apparatus as claimed in claim 1, wherein:
   the second absolute rotation angle calculation section stores data representing a second absolute rotation angle conversion map, wherein the second absolute rotation angle conversion map has a first coordinate axis representing one of the third rotation angle and the fourth rotation angle and a second coordinate axis representing another one of the third rotation angle and the fourth rotation angle;
   the first coordinate axis of the second absolute rotation angle conversion map is defined to have a range in degree from zero to 360 which corresponds to one rotation of the one of the third rotation angle and the fourth rotation angle;
   the second coordinate axis of the second absolute rotation angle conversion map is defined to have a range in degree from zero to 360 which corresponds to one rotation of the another one of the third rotation angle and the fourth rotation angle;
   the second absolute rotation angle conversion map includes a plurality of regions which define combinations of the third rotation angle and the fourth rotation angle, wherein each combination of the third rotation angle and the fourth rotation angle corresponds to a value of the second absolute rotation angle;
   the plurality of regions of the second absolute rotation angle conversion map include:
      a first region having a beginning end point where the first coordinate axis indicates zero and the second coordinate axis indicates a value of the another one of the third rotation angle and the fourth rotation angle when the one of the third rotation angle and the fourth rotation angle has reached 360 degrees, and having a terminating end point where the another one of the third rotation angle and the fourth rotation angle has reached 360 degrees; and
      a second region having a beginning end point where the second coordinate axis indicates zero and the first coordinate axis indicates a value of the one of the third rotation angle and the fourth rotation angle when the another one of the third rotation angle and the fourth rotation angle has reached 360 degrees, and having a terminating end point where the one of the third rotation angle and the fourth rotation angle has reached 360 degrees;

the second absolute rotation angle calculation section is configured to calculate the second absolute rotation angle over a range having a maximum value more than 360 degrees on the basis of the third rotation angle and the fourth rotation angle with reference to the second absolute rotation angle conversion map; and the abnormality detection section is configured to determine presence of the abnormality in response to a condition where the second absolute rotation angle is different from the first absolute rotation angle by more than a predetermined threshold value in the second absolute rotation angle conversion map, wherein the predetermined threshold value is a sum of $\alpha/2$ and a predetermined margin value, wherein $\alpha$ represents an absolute value of an angle that is obtained by subtracting 360 degrees from a value of the rotation angle of the second rotation member corresponding to one rotation of the first rotation member.

3. The power steering apparatus as claimed in claim 2, wherein the abnormality detection section is configured to determine presence of the abnormality in response to a condition where the second absolute rotation angle is different from the first absolute rotation angle by more than $\alpha/2$.

4. The power steering apparatus as claimed in claim 1, wherein:

the second absolute rotation angle calculation section stores data representing a second absolute rotation angle conversion map, wherein the second absolute rotation angle conversion map has a first coordinate axis representing one of the third rotation angle and the fourth rotation angle and a second coordinate axis representing another one of the third rotation angle and the fourth rotation angle;

the first coordinate axis of the second absolute rotation angle conversion map is defined to have a range in degree from zero to 360 which corresponds to one rotation of the one of the third rotation angle and the fourth rotation angle;

the second coordinate axis of the second absolute rotation angle conversion map is defined to have a range in degree from zero to 360 which corresponds to one rotation of the another one of the third rotation angle and the fourth rotation angle;

the second absolute rotation angle conversion map includes a plurality of regions which define combinations of the third rotation angle and the fourth rotation angle, wherein each combination of the third rotation angle and the fourth rotation angle corresponds to a value of the second absolute rotation angle;

the plurality of regions of the second absolute rotation angle conversion map include:

a first region having a beginning end point where the first coordinate axis indicates zero and the second coordinate axis indicates a value of the another one of the third rotation angle and the fourth rotation angle when the one of the third rotation angle and the fourth rotation angle has reached 360 degrees, and having a terminating end point where the another one of the third rotation angle and the fourth rotation angle has reached 360 degrees; and a second region having a beginning end point where the second coordinate axis indicates zero and the first coordinate axis indicates a value of the one of the third rotation angle and the fourth rotation angle when the another one of the third rotation angle and the fourth rotation angle has reached 360 degrees, and having a terminating end point where the one of the third rotation angle and the fourth rotation angle has reached 360 degrees;

the second absolute rotation angle calculation section is configured to calculate the second absolute rotation angle over a range having a maximum value more than 360 degrees on the basis of the third rotation angle and the fourth rotation angle with reference to the second absolute rotation angle conversion map;

the abnormality detection section is configured to determine presence of the abnormality in response to a condition where the second absolute rotation angle is out of a predetermined normal region with respect to a reference point in the second absolute rotation angle map, wherein the reference point corresponds to the first absolute rotation angle; and the normal region is a region enclosed by $\pm 180\alpha/(360-\alpha)$ in the first coordinate axis from the reference point and by $\pm\alpha/2$ in the second coordinate axis from the reference point, wherein $\alpha$ represents an absolute value of an angle that is obtained by subtracting 360 degrees from a value of the rotation angle of the second rotation member corresponding to one rotation of the first rotation member.

5. The power steering apparatus as claimed in claim 1, wherein the first absolute rotation angle calculation section is configured to calculate the first absolute rotation angle by a process when the electrical control unit gets energized from a de-energized state, the process including:

calculating on a basis of the second absolute rotation angle a rotation count representing a number of rotations of the steering wheel from a neutral position; and calculating the first absolute rotation angle on a basis of the first rotation angle, the second rotation angle, and the calculated rotation count, wherein the absolute rotation angle of the steering wheel is a total amount of rotation from the neutral position.

6. The power steering apparatus as claimed in claim 1, wherein:

each of the first rotation member and the second rotation member includes a magnetic member magnetized to have a north pole and a south pole; and each of the third rotation angle sensor and the fourth rotation angle sensor includes a magnetic resistance sensor configured to sense as a change in resistance of a resistance element a change of a magnetic field occurring between the north pole and the south pole.

7. The power steering apparatus as claimed in claim 6, wherein the electrical control unit includes:

a sensor electrical control unit configured to:
  receive input of output signals of the first rotation angle sensor, the second rotation angle sensor, the third rotation angle sensor, and the fourth rotation angle sensor as sine wave signals and cosine wave signals; and
  calculate the rotation angle of the steering shaft on a basis of the sine wave signals and the cosine wave signals; and a motor electrical control unit configured to calculate the command value of the current on a basis of a result of calculation of the sensor electrical control unit, wherein the motor electrical control unit is provided with the motor command value calculation section.

8. The power steering apparatus as claimed in claim 7, wherein the motor electrical control unit is provided with the abnormality detection section.

9. The power steering apparatus as claimed in claim 8, wherein the motor electrical control unit includes a multiple-core microcomputer including a plurality of processor cores mounted in a processor package.

10. The power steering apparatus as claimed in claim 1, wherein the steering shaft includes:
   a first pinion shaft provided at the output shaft;
   a rack bar including a first tooth section and a second tooth section, wherein the first tooth section meshes with the first pinion shaft;
   a second pinion shaft meshing with the second tooth section of the rack bar;
   a worm wheel provided at the second pinion shaft; and
   a worm shaft configured to mesh with the worm wheel and receive a torque from the electric motor.

11. The power steering apparatus as claimed in claim 10, wherein the motor electrical control unit is connected to the electric motor.

12. A controller for a power steering apparatus, wherein the power steering apparatus is configured to apply a steering effort to a steerable wheel of a vehicle by an electric motor in response to steering operation of a steering wheel, the controller comprising an electrical control unit configured to control operation of the electric motor on a basis of an operating condition of the vehicle, wherein the electrical control unit includes:
   a first rotation angle obtaining section configured to receive a signal indicative of a first rotation angle that is a rotation angle of an input shaft of a steering shaft, wherein the input shaft is configured to be rotated by steering operation of the steering wheel;
   a steering torque calculation section configured to calculate a steering torque on a basis of a relative rotation between the first rotation angle and a second rotation angle that is a rotation angle of an output shaft of the steering shaft, wherein the steering shaft includes a torsion bar connected between the input shaft and the output shaft, and wherein the steering torque occurs in the steering shaft;
   a motor command value calculation section configured to calculate a command value of a current supplied to the electric motor on a basis of the steering torque;
   a third rotation angle obtaining section configured to receive a signal indicative of a third rotation angle that is a rotation angle of a first rotation member, wherein the first rotation member is configured to be rotated by rotation of the steering shaft;
   a fourth rotation angle obtaining section configured to receive a signal indicative of a fourth rotation angle that is a rotation angle of a second rotation member, wherein the second rotation member is configured to be rotated by rotation of the first rotation member at a gear ratio other than one with respect to the first rotation member;
   a first absolute rotation angle calculation section configured to calculate a first absolute rotation angle as a first estimate of an absolute rotation angle of the steering wheel on a basis of at least one of combinations, wherein the combinations include a combination of the first rotation angle and the second rotation angle, a combination of the first rotation angle and the third rotation angle, a combination of the first rotation angle and the fourth rotation angle, a combination of the second rotation angle and the third rotation angle, and a combination of the second rotation angle and the fourth rotation angle;
   a second absolute rotation angle calculation section configured to calculate a second absolute rotation angle as a second estimate of the absolute rotation angle of the so steering wheel on a basis of a combination of the third rotation angle and the fourth rotation angle; and
   an abnormality detection section configured to detect an abnormality by comparison between the first absolute rotation angle and the second absolute rotation angle.

13. The controller as claimed in claim 12, wherein:
   the second absolute rotation angle calculation section stores data representing a second absolute rotation angle conversion map, wherein the second absolute rotation angle conversion map has a first coordinate axis representing one of the third rotation angle and the fourth rotation angle and a second coordinate axis representing another one of the third rotation angle and the fourth rotation angle;
   the first coordinate axis of the second absolute rotation angle conversion map is defined to have a range in degree from zero to 360 which corresponds to one rotation of the one of the third rotation angle and the fourth rotation angle;
   the second coordinate axis of the second absolute rotation angle conversion map is defined to have a range in degree from zero to 360 which corresponds to one rotation of the another one of the third rotation angle and the fourth rotation angle;
   the second absolute rotation angle conversion map includes a plurality of regions which define combinations of the third rotation angle and the fourth rotation angle, wherein each combination of the third rotation angle and the fourth rotation angle corresponds to a value of the second absolute rotation angle;
   the plurality of regions of the second absolute rotation angle conversion map include:
      a first region having a beginning end point where the first coordinate axis indicates zero and the second coordinate axis indicates a value of the another one of the third rotation angle and the fourth rotation angle when the one of the third rotation angle and the fourth rotation angle has reached 360 degrees, and having a terminating end point where the another one of the third rotation angle and the fourth rotation angle has reached 360 degrees; and
      a second region having a beginning end point where the second coordinate axis indicates zero and the first coordinate axis indicates a value of the one of the third rotation angle and the fourth rotation angle when the another one of the third rotation angle and the fourth rotation angle has reached 360 degrees, and having a terminating end point where the one of the third rotation angle and the fourth rotation angle has reached 360 degrees;
   the second absolute rotation angle calculation section is configured to calculate the second absolute rotation angle over a range having a maximum value more than 360 degrees on the basis of the third rotation angle and the fourth rotation angle with reference to the second absolute so rotation angle conversion map; and
   the abnormality detection section is configured to determine presence of the abnormality in response to a condition where the second absolute rotation angle is different from the first absolute rotation angle by more than a predetermined threshold value in the second absolute rotation angle conversion map, wherein the predetermined threshold value is a sum of $\alpha/2$ and a predetermined margin value, wherein $\alpha$ represents an absolute value of an angle that is obtained by subtracting 360 degrees from a value of the rotation angle of the second rotation member corresponding to one rotation of the first rotation member.

14. The controller as claimed in claim 13, wherein the abnormality detection section is configured to determine presence of the abnormality in response to a condition where the second absolute rotation angle is different from the first absolute rotation angle by more than $\alpha/2$.

15. The controller as claimed in claim 12, wherein:
the second absolute rotation angle calculation section stores data representing a second absolute rotation angle conversion map, wherein the second absolute rotation angle conversion map has a first coordinate axis representing one of the third rotation angle and the fourth rotation angle and a second coordinate axis representing another one of the third rotation angle and the fourth rotation angle;
the first coordinate axis of the second absolute rotation angle conversion map is defined to have a range in degree from zero to 360 which corresponds to one rotation of the one of the third rotation angle and the fourth rotation angle;
the second coordinate axis of the second absolute rotation angle conversion map is defined to have a range in degree from zero to 360 which corresponds to one rotation of the another one of the third rotation angle and the fourth rotation angle;
the second absolute rotation angle conversion map includes a plurality of regions which define combinations of the third rotation angle and the fourth rotation angle, wherein each combination of the third rotation angle and the fourth rotation angle corresponds to a value of the second absolute rotation angle;
the plurality of regions of the second absolute rotation angle conversion map include:
a first region having a beginning end point where the first coordinate axis indicates zero and the second coordinate axis indicates a value of the another one of the third rotation angle and the fourth rotation angle when the one of the third rotation angle and the fourth rotation angle has reached 360 degrees, and having a terminating end point where the another one of the third rotation angle and the fourth rotation angle has reached 360 degrees; and
a second region having a beginning end point where the second coordinate axis indicates zero and the first coordinate axis indicates a value of the one of the third rotation angle and the fourth rotation angle when the another one of the third rotation angle and the fourth rotation angle has reached 360 degrees, and having a terminating end point where the one of the third rotation angle and the fourth rotation angle has reached 360 degrees;
the second absolute rotation angle calculation section is configured to calculate the second absolute rotation angle over a range having a maximum value more than 360 degrees on the basis of the third rotation angle and the fourth rotation angle with reference to the second absolute rotation angle conversion map;
the abnormality detection section is configured to determine presence of the abnormality in response to a condition where the second absolute rotation angle is out of a predetermined normal region with respect to a reference point in the second absolute rotation angle map, wherein the reference point corresponds to the first absolute rotation angle; and
the normal region is a region enclosed by $\pm 180\alpha/(360-\alpha)$ in the first coordinate axis from the reference point and by $\pm\alpha/2$ in the second coordinate axis from the reference point, wherein a represents an absolute value of an angle that is obtained by subtracting 360 degrees from a value of the rotation angle of the second rotation member corresponding to one rotation of the first rotation member.

16. The controller as claimed in claim 12, wherein the first absolute rotation angle calculation section is configured to calculate the first absolute rotation angle by a process when the electrical control unit gets energized from a de-energized state, the process including:
calculating on a basis of the second absolute rotation angle a rotation count representing a number of rotations of the steering wheel from a neutral position; and
calculating the first absolute rotation angle on a basis of the first rotation angle, the second rotation angle, and the calculated rotation count, wherein the absolute rotation angle of the steering wheel is a total amount of rotation from the neutral position.

17. The controller as claimed in claim 12, wherein the electrical control unit includes:
a sensor electrical control unit configured to:
receive input of output signals of the first rotation angle sensor, the second rotation angle sensor, the third rotation angle sensor, and the fourth rotation angle sensor as sine wave signals and cosine wave signals; and
calculate the rotation angle of the steering shaft on a basis of the sine wave signals and the cosine wave signals; and
a motor electrical control unit configured to calculate the command value of the current on a basis of a result of calculation of the sensor electrical control unit, wherein the motor electrical control unit is provided with the motor command value calculation section.

18. The controller as claimed in claim 17, wherein the motor electrical control unit is provided with the abnormality detection section.

19. The controller as claimed in claim 18, wherein the motor electrical control unit includes a multiple-core microcomputer including a plurality of processor cores mounted in a processor package.

* * * * *